Patented Aug. 8, 1939

2,168,844

UNITED STATES PATENT OFFICE 2,168,844

PRODUCTION OF GLUTARIC ACID

Maurice H. Nelles, Long Beach, Calif., assignor to Union Oil Company of California, Los Angeles, Calif., a corporation of California No Drawing. Application April 3, 1936, Serial No. 72,590

6 Claims. (Cl. 260—533)

This invention relates to the oxidation of petroleum fractions and more particularly pertains to the synthetic production of glutaric acid having the general formula of $C_5H_8O_4$, and/or of glutaric anhydride the formula of which is $C_5H_6O_3$.

Until the present time glutaric acid and/or anhydride has been produced by oxidation of certain higher aromatic compounds such as cyclohexanol, by reaction with nitric acid. It has now been discovered that relatively large quantities of glutaric acid may be obtained by vapor phase oxidation of cyclohexane and/or of substituted cyclohexanes, by heating them in the presence of air or of other oxygen-containing gases. More specifically it has been discovered that a substituted cyclohexane, such as methyl cyclohexane, when vaporized, commingled with air, and passed over a catalyst such as vanadium pentoxide at a temperature of approximately 900° F., produces large quantities of glutaric acid and/or anhydride.

Instead of using pure compounds, I have discovered that I may produce glutaric acid and/or anhydride by oxidizing petroleum fractions rich in cyclohexane and substituted cyclohexanes. Thus, it has been discovered that a gasoline fraction having a boiling range of between about 75° and 125° C. and obtained from California Valley crude oil, contains large quantities of alkylated and/or substituted cyclohexanes, and may therefore be advantageously oxidized to glutaric acid by the above-described method of commingling the vapors of said gasoline fraction with air and passing said mixture over a catalyst maintained at approximately 900° F.

The following example is given hereinbelow to illustrate further the new process of producing glutaric acid by the vapor phase oxidation of cyclohexane, substituted cyclohexanes, or petroleum fractions rich in said substances, with air or other oxygen-containing gases:

Methyl cyclohexane, the boiling point of which is 100.7° C., was commingled with air in the proportion of 30 to 1 by weight, and passed in a vapor phase through a converter maintained at approximately 900° F. and containing a vanadium oxide catalyst. The catalyst used for this example was prepared by heating ordinary commercial ammonium metavanadate at a temperature of approximately 700° C. This causes the fusion of the substance and the production of vanadium pentoxide. The fused material was then pulverized and was employed in such pulverulent state.

The velocity of the mixture of methyl cyclohexane and air passed through the converter was controlled to obtain a contact time of approximately 0.25 seconds. After passage through the converter the mixture was cooled by passing it through a chamber chilled by solid carbon dioxide. The condensed product was then commingled with distilled water to dissolve the glutaric acid. After separation from the undissolved portion, the water was evaporated. The glutaric acid crystallized out in the form of monoclinic plates, the crystals having a melting point of slightly less than 100° C. which corresponds to the melting point of glutaric acid. When the crystals are heated to their melting point, the acid slowly decomposes to form glutaric anhydride.

Although the above example discloses the use of methyl cyclohexane, it is obvious that other substituted cyclohexanes and the unsubstituted cyclohexanes may also be used to produce glutaric acid and/or anhydride. Also, the cyclohexane or its substitutions may either be in a pure state or commingled with other hydrocarbon fractions. As stated previously, petroleum fractions, and particularly those rich in cyclohexanes and substituted cyclohexanes may also be oxidized according to the present invention to produce a glutaric acid.

It is also obvious that the invention is not limited to the use of the specific catalyst mentioned in the above example since catalysts other than oxides of vanadium may be employed.

When the term "glutaric acid" is employed in the appended claims, it is intended to include also the anhydride of said acid.

The invention is not to be considered to be limited by any theories or examples given herein, the scope of the invention being coextensive with and limited only by the appended claims.

I claim:

1. In a process for the production of glutaric acid, the step of partially oxidizing methyl cyclohexane in the vapor phase by means of an oxygen-containing gas.

2. In a process for the production of glutaric acid, the step of partially oxidizing methyl cyclohexane in the vapor phase and in the presence of an oxidation-promoting catalyst by means of an oxygen-containing gas.

3. In a process for the production of glutaric acid, the steps of commingling methyl cyclohexane with an oxygen-containing gas, partially oxidizing said mixture in a vapor phase and in a heated state to produce an oxidation reaction, condensing the products of reaction and separating the glutaric acid from said products of reaction.

4. In a process according to claim 3, wherein the oxidation reaction is carried out in the presence of an oxidation-promoting catalyst.

5. In a process for production of glutaric acid, the steps of commingling methyl cyclohexane with air in the proportion of 30 parts by weight of air to 1 part by weight of said methyl cyclohexane, conveying said mixture in a vapor phase through a converter maintained at approximately 900° F. to promote partial oxidation of said methyl cyclohexane, condensing the products of reaction, and separating the glutaric acid from said products of reaction.

6. In a process according to claim 5 wherein the velocity of the mixture of methyl cyclohexane and air passing through the converter is regulated to obtain a contact period between said mixture and the catalyst of approximately 0.25 second.

MAURICE H. NELLES.